(12) United States Patent
Wagner

(10) Patent No.: US 10,065,803 B1
(45) Date of Patent: Sep. 4, 2018

(54) CONNECTION DEVICE FOR CONVEYORS

(71) Applicants: FLSMIDTH A/S, Valby (DK); Ted Wagner, Spokane, WA (US)

(72) Inventor: Ted Wagner, Deer Park, WA (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 15/753,997

(22) PCT Filed: Sep. 30, 2015

(86) PCT No.: PCT/US2015/053207
§ 371 (c)(1),
(2) Date: Feb. 21, 2018

(87) PCT Pub. No.: WO2017/058201
PCT Pub. Date: Apr. 6, 2017

(51) Int. Cl.
*B65G 41/00* (2006.01)
*B65G 21/06* (2006.01)
*B65G 65/28* (2006.01)
*B62D 55/28* (2006.01)
*B65G 37/00* (2006.01)

(52) U.S. Cl.
CPC .......... *B65G 21/06* (2013.01); *B65G 41/007* (2013.01); *B65G 65/28* (2013.01); *B62D 55/28* (2013.01); *B65G 37/005* (2013.01)

(58) Field of Classification Search
CPC ........ B65G 21/00; B65G 21/02; B65G 21/06; B65G 41/00; B65G 41/02; B65G 41/008; B65G 41/006; F16B 19/00; F16B 45/00
USPC ........................................................ 198/303
See application file for complete search history.

(56) References Cited

U.S. PATENT DOCUMENTS

| 2,191,621 A | * | 2/1940 | Packer | B65G 41/02 |
| | | | | 105/179 |
| 2,250,933 A | * | 7/1941 | Manierre | B65G 21/14 |
| | | | | 180/14.1 |
| 4,646,906 A | * | 3/1987 | Wilcox, Jr. | B65G 21/14 |
| | | | | 198/303 |

(Continued)

FOREIGN PATENT DOCUMENTS

| KR | 101449362 | 10/2014 |
| SU | 377524 | 4/1973 |

OTHER PUBLICATIONS

The International Search Report and Written Opinion dated Jan. 14, 2016, 7 pages.

*Primary Examiner* — James R Bidwell
(74) *Attorney, Agent, or Firm* — Matthew R. Weaver

(57) ABSTRACT

A connection device for attaching and detaching a frame of a first mobile conveyor section to or from a frame of a second mobile conveyor section comprising: a first portion comprising an upper first portion clamp, a lower first portion clamp and a first middle nub portion disposed between the upper and lower first portion clamps, the first middle nub portion comprising a spherical bearing with a pin disposed laterally therethough; a second portion comprising an upper second portion clamp, a lower second portion clamp and a second middle nub portion disposed between the upper and lower second portion clamps, the second middle nub portion comprising an insertion ramp; and a removable clamp for securing the spherical bearing with a pin in the insertion ramp. Also provided is a mobile conveyor system comprising the connection device.

14 Claims, 6 Drawing Sheets

(56) References Cited

U.S. PATENT DOCUMENTS

| | | | | |
|---|---|---|---|---|
| 4,784,439 A | * | 11/1988 | Wrulich | E21D 9/1026 198/303 |
| 5,163,545 A | * | 11/1992 | David | B65G 41/02 198/588 |
| 5,634,545 A | * | 6/1997 | Plumley | B65G 37/00 198/303 |
| 6,386,352 B1 | * | 5/2002 | Baker | B65G 41/005 198/300 |
| 2015/0021146 A1 | | 1/2015 | Hanks et al. | |

* cited by examiner

CONNECTION DEVICE FOR CONVEYORS

FIELD OF THE INVENTION

The present invention relates to conveyor systems, and more particularly to mobile conveying systems in the mining industry which may include a connection device for connecting two or more conveyors or conveyor sections.

BACKGROUND OF THE INVENTION

Mobile conveyors are used for various purposes, such as in mining. For example, mobile conveyors can be used for excavating, stacking or reclaiming material such as ore, coal, granite, clay, salt, potash or other bulk material. Mobile conveyor sections or numerous mobile conveyor frames are joined together in order to create longer mobile conveyor systems. Prior art systems for joining together multiple mobile conveyors/mobile conveyor sections are inadequate. For example, such prior art systems result in time consuming, difficult and dangerous assembly. For example, in prior art systems, each approximately 40-80 ton mobile conveyor/mobile conveyor section is suspended by a crane, the holes in each heavy mobile conveyor/mobile conveyor section are aligned, a pin is carefully slid/press fit into and through the aligned hole (which must maintain alignment throughout the process) and thereafter the conveyor/sections are fused by e.g. welding the pin into the hole or bolting with a keeper. Because of the e.g. press fitting, weldment or bolting required, prior art systems are also difficult to disassemble.

OBJECT OF THE INVENTION

It is an object of the invention to overcome or at least alleviate one or more of the above problems and/or provide the consumer with a useful or commercial choice.

SUMMARY OF THE INVENTION

A mobile conveyor system for stacking aggregate is provided. The mobile conveyor system may comprise: a first mobile conveyor section comprising a first mobile conveyor frame; a second mobile conveyor section comprising a second mobile conveyor frame; and a connection device for attaching and detaching the first mobile conveyor frame to and from the second mobile conveyor frame. The connection device may be laterally disposed between the first mobile conveyor section and the second mobile conveyor section and attached to the first mobile conveyor frame and second mobile conveyor frame. The connection device may comprise: a first portion for connection to the first mobile conveyor frame, a second portion for connection to the second mobile conveyor frame and a removable clamp for securing the pin in the insertion ramp. The first portion may comprise an upper first portion clamp, a lower first portion clamp and a first middle nub portion disposed between the upper and lower first portion clamps. The first middle nub portion may comprise a spherical bearing with a pin disposed laterally there through. The second portion may comprise an upper second portion clamp, a lower second portion clamp and a second middle nub portion disposed between the upper and lower second portion clamps. The second middle nub portion may comprise an insertion ramp.

In an exemplary embodiment of the mobile conveyor system, the insertion ramp may comprise a first arm and a second arm. The first arm and the second arm may define a first semicircular cavity. The first semicircular cavity may be configured to receive a laterally extending portion of the pin.

In an exemplary embodiment of the mobile conveyor system, the first arm and the second arm may be at an angle of approximately 0 to 60 degrees with a horizontal plane. In an exemplary embodiment, the angle may be approximately 30 degrees.

In an exemplary embodiment of the mobile conveyor system, the removable clamp may comprise a first clamp bar and a second clamp bar. The first clamp bar and the second clamp bar may define a second semicircular cavity. The second semicircular cavity may be configured to receive a laterally extending portion of the pin.

In an exemplary embodiment of the mobile conveyor system, the first arm and the second arm may comprise bores. The bores may be configured to receive bolts for securing the pin in the insertion ramp via the removable clamp.

A connection device for attaching and detaching a frame of a first mobile conveyor section to or from a frame of a second mobile conveyor section is also provided. The connection device may comprise: a first portion for connection to the first mobile conveyor frame, a second portion for connection to the second mobile conveyor frame and a removable clamp for securing the pin in the insertion ramp. The first portion may comprise an upper first portion clamp, a lower first portion clamp and a first middle nub portion disposed between the upper and lower first portion clamps. The first middle nub portion may comprise a spherical bearing with a pin disposed laterally therethough. The second portion may comprise an upper second portion clamp, a lower second portion clamp and a second middle nub portion disposed between the upper and lower second portion clamps. The second middle nub portion may comprise an insertion ramp.

In an exemplary embodiment of the connection device, the insertion ramp may comprise a first arm and a second arm. The first arm and the second arm may define a first semicircular cavity. The first semicircular cavity may be configured to receive a laterally extending portion of the pin.

In an exemplary embodiment of the connection device, the first arm and the second arm may be at an angle of approximately 0 to 60 degrees with a horizontal plane. In an exemplary embodiment, the angle may be approximately 30 degrees.

In an exemplary embodiment of the connection device, the removable clamp may comprise a first clamp bar and a second clamp bar. The first clamp bar and the second clamp bar may define a second semicircular cavity. The second semicircular cavity may be configured to receive a laterally extending portion of the pin.

In an exemplary embodiment of the connection device, the first arm and the second arm may comprise bores. The bores may be configured to receive bolts for securing the pin in the insertion ramp via the removable clamp.

Other details, objects, and advantages of the invention will become apparent as the following description of certain present exemplary embodiments thereof and certain present exemplary methods of practicing the same proceeds.

BRIEF DESCRIPTION OF THE FIGURES

Embodiments of the invention, by way of example only, will be described with reference to the accompanying drawings in which.

DETAILED DESCRIPTION OF THE INVENTION

Figure 1:
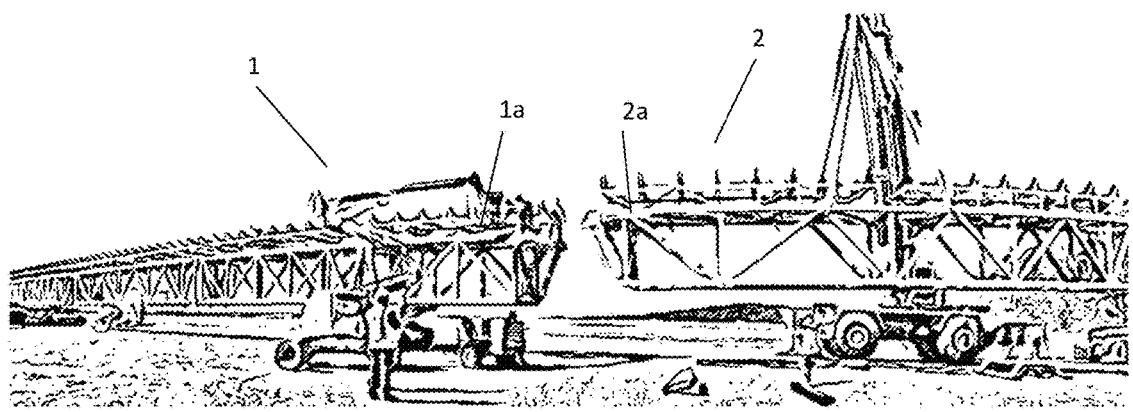
FIG. 1 shows an overview of an exemplary embodiment of a mobile conveyor system including a first mobile conveyor section with a first mobile conveyor frame and a second mobile conveyor section with a second mobile conveyor frame.
Figure 2:
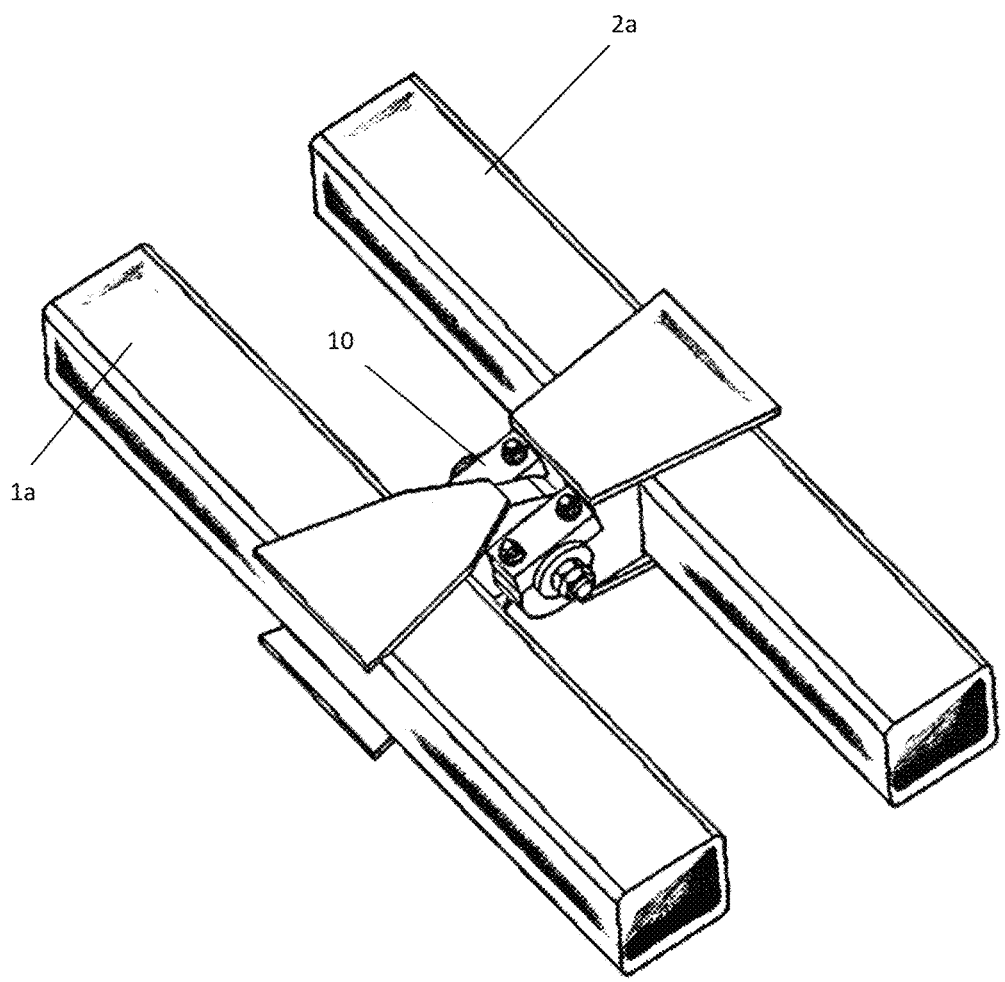
FIG. 2 shows an overview of an exemplary embodiment of the connection device according to the invention.

FIG. 1 depicts an exemplary embodiment of a mobile conveyor system. In an exemplary embodiment, the mobile conveyor system includes a first mobile conveyor (or first mobile conveyor section) 1 with a first mobile conveyor frame 1a and a second mobile conveyor (or second mobile conveyor section) 2 with a second mobile conveyor frame 2a. As shown in FIGS. 2-5, the mobile conveyor system also includes a connection device 10. The connection device 10 can be used for attaching and detaching the first mobile conveyor frame 1a to and from the second mobile conveyor frame 2a. In an exemplary embodiment, the connection device 10 is laterally disposed between the first mobile conveyor section 1 and the second mobile conveyor section 2 and attached to the first mobile conveyor frame 1a and the second mobile conveyor frame 2a.

Figure 3A:
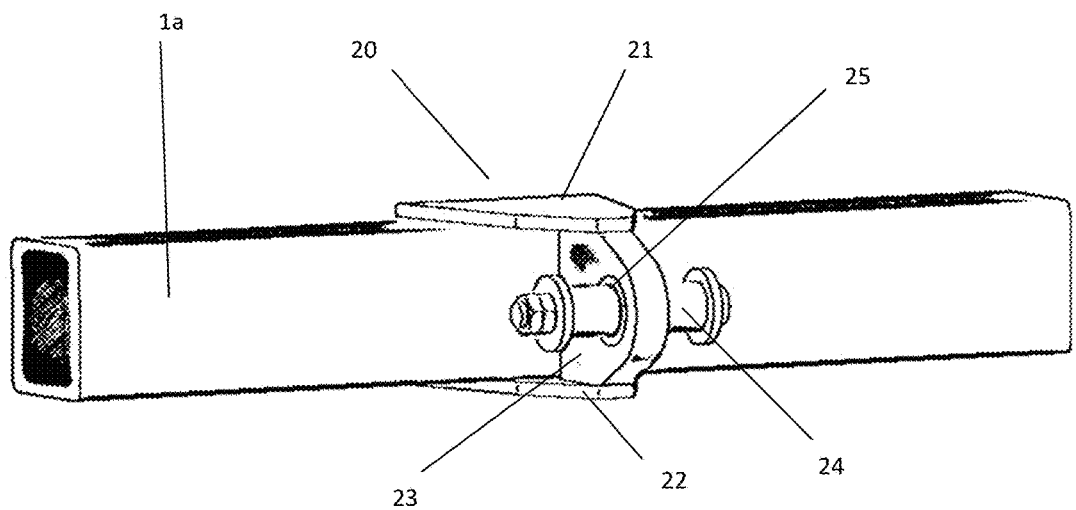
FIG. 3A shows an overview of an exemplary embodiment of the first portion of the connection device according to the invention.

FIG. 3A depicts an exemplary embodiment of a first portion 20 of the connection device 10. The first portion 20 of the connection device 10 may be connected to the first mobile conveyor frame 1a. For example, in some embodiments the first portion 20 of the connection device 10 is comprised of a clamp which can quickly be attached to a first mobile conveyor (or first mobile conveyor section) 1. The clamp is comprised of an upper first portion clamp 21, a lower first portion clamp 22 and a first middle nub portion 23. The upper first portion clamp 21 is disposed on the top face of the first mobile conveyor frame 1a and the lower first portion clamp 22 is disposed on the bottom face of the first mobile conveyor frame 1a. The first middle nub portion 23 is typically sandwiched between the upper first portion clamp 21 and lower first portion clamp 22, and a lateral face of the first middle nub portion 23 abuts a lateral face of the first mobile conveyor frame 1a. In an exemplary embodiment, the first middle nub portion 23 is comprised of a spherical bearing 25 which can accommodate a pin 24 being disposed through the spherical bearing 25. In some embodiments, the spherical bearing 25 is pre-welded into the first middle nub portion 23. In typical applications, spherical bearings 25 would not be weld into place, however in the present application the spherical bearing 25 moves minimally and slowly and will not typically need to be replaced. In some embodiments the pin 24 has a first end region and a second end region. The first and second end regions may comprise protrusions which have a larger circumference than the center region of the pin (i.e—the region of the pin between the first and second end regions). The spherical bearing 25 is advantageous in that it tolerates some lateral motion which allows flexing of the connection device 10 when the conveyor system moves over uneven ground or when the conveyor system moves in the axial direction.

Figure 3B:
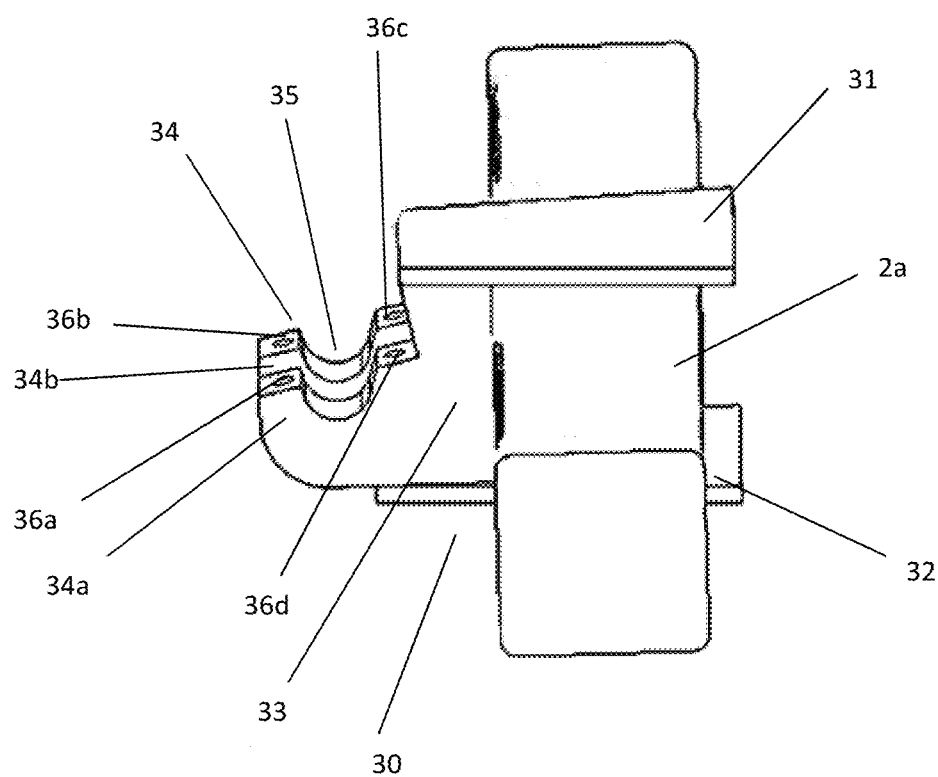
FIG. 3B shows an overview of an exemplary embodiment of the second portion of the connection device according to the invention.

FIG. 3B depicts an exemplary embodiment of a second portion 30 of the connection device 10. The second portion 30 of the connection device 10 may be connected to the second mobile conveyor frame 2a. For example, in some embodiments the second portion 30 of the connection device 10 is comprised of a clamp which can quickly be attached to a second mobile conveyor (or second mobile conveyor section) 2. The clamp is comprised of an upper second portion clamp 31, a lower second portion clamp 32 and a second middle nub portion 33. The upper second portion clamp 31 is disposed on the top face of the second mobile conveyor frame 2a and the lower second portion clamp 32 is disposed on the bottom face of the second mobile conveyor frame 2a. The second middle nub portion 33 is typically sandwiched between the upper second portion clamp 31 and lower second portion clamp 32, and a lateral face of the second middle nub portion 33 abuts a lateral face of the second mobile conveyor frame 2a. In an exemplary embodiment, the second middle nub portion 33 is comprised of an insertion ramp 34. In an exemplary embodiment, as shown in e.g. FIGS. 3B, 4 and 5, the insertion ramp 34 comprises a first arm 34a and a second arm 34b. The first arm 34a and the second arm 34b define a first semicircular cavity 35. The first semicircular cavity 35 may be configured to receive a laterally extending portion of the pin 24. The first arm 34a and second arm 34b are arranged substantially parallel to one another. In some embodiments the first arm 34a and second arm 35b have a gap there between which can accommodate a portion of first middle nub portion 23 of the first portion 20 of the connection device 10 when the pin 24 rests on the first arm 34a and second arm 34b and when the pin is disposed in the first semicircular cavity 35.

Figure 5:
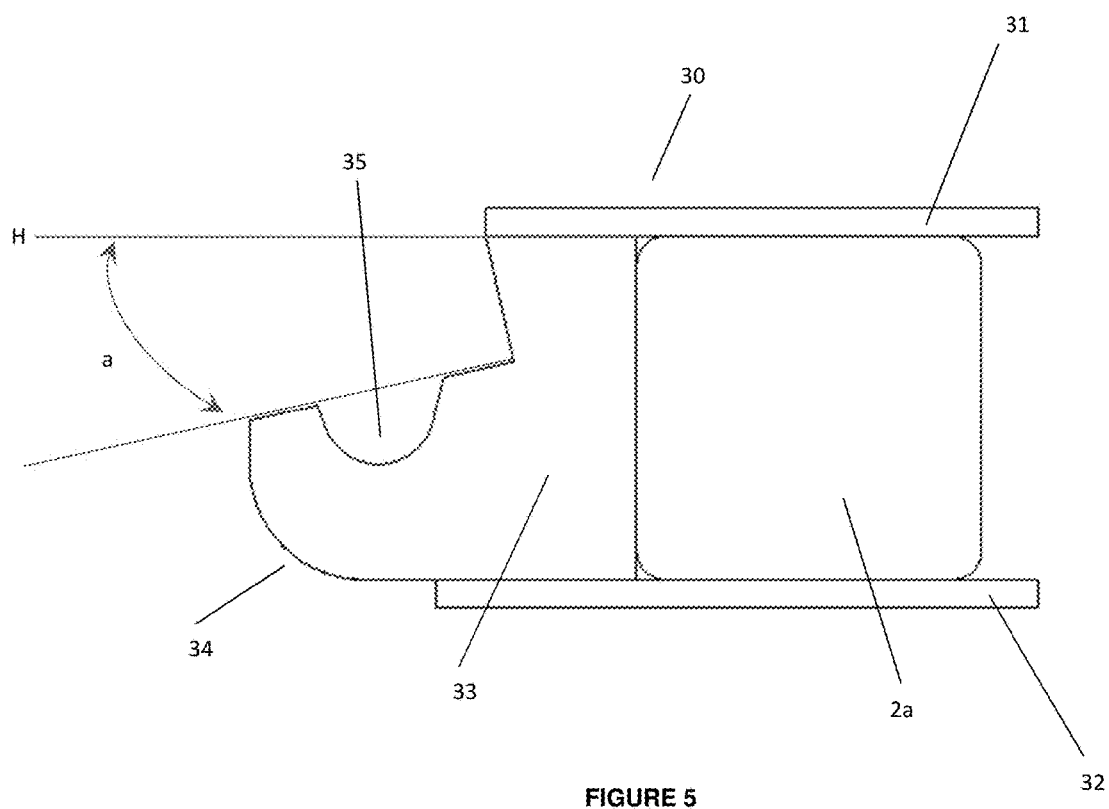
FIG. 5 shows a close-up side view of an exemplary embodiment of the second portion of the connection device according to the invention.

Further, as shown in FIG. 5, in some embodiments the first arm 34a and the second arm 34b are at an angle (a) of approximately 0 to 60 degrees with the horizontal plane (H) of the top surface of the second mobile conveyor frame 2a. In another embodiment, the first arm 34a and the second arm 34b are at an angle (a) of approximately 30 degrees with the horizontal plane (H). Such angles (a) assist with ease of connection, placement and locking.

Figure 4:
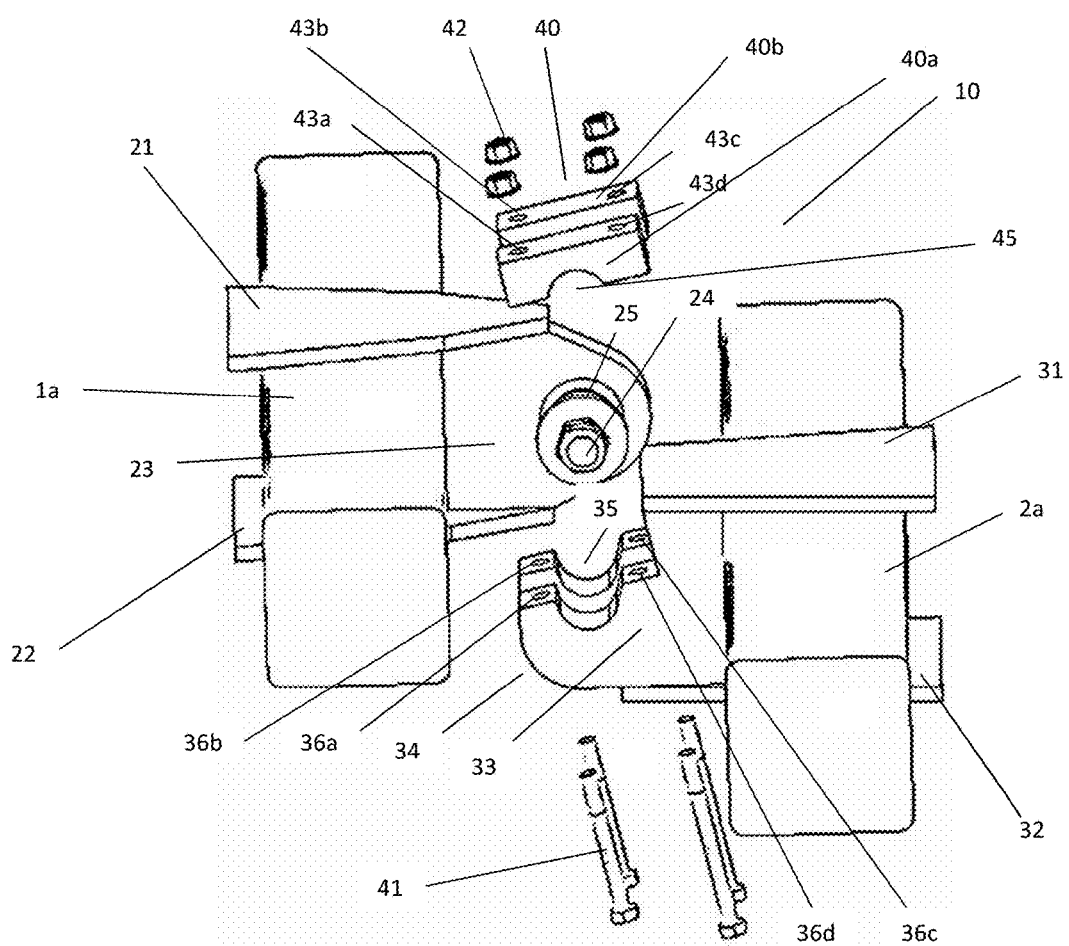
FIG. 4 shows an exploded view of an exemplary embodiment of the connection device according to the invention.

As shown in FIG. 4, in some embodiments the connection device 10 may also comprise a removable clamp 40. The removable clamp 40 is designed so that it can secure the pin 24 (which is disposed laterally through the spherical bearing 25) in the insertion ramp 34. In some embodiments, the removable clamp 40 secures the spherical bearing with a pin 24 in the first semicircular cavity 35. In an exemplary embodiment, the removable clamp 40 is comprised of a first clamp bar 40a and a second clamp bar 40b. The first clamp bar 40a may be connected to or integrally formed with the second clamp bar 40b or the first clamp bar 40a may be a separate component than the second clamp bar 40b. The first clamp bar 40a and the second clamp bar 40b define a second semicircular cavity 45. The second semicircular cavity 45 may be configured to receive a laterally extending portion of the pin 24. The first clamp bar 40a and the second clamp bar 40b are arranged substantially parallel to one another. In some embodiments, the first clamp bar 40a and the second clamp bar 40b have a gap there between which can accommodate a portion of first middle nub portion 23 of the first portion 20 of the connection device 10 when the pin 24 rests on the first arm 34a and second arm 34b, when the pin is disposed in the first semicircular cavity 35, when the first clamp bar 40a rests on the first arm 34a and the second clamp bar 40b rests on the second arm 34b and when the pin 24 is disposed in the second semicircular cavity 45.

As further shown in FIGS. 3B and 4, in an exemplary embodiment, the insertion ramp 34 comprises bores 36a-36d which extend longitudinally through the insertion ramp 34. In some embodiments the first arm 34a and the second arm 34b each contain bores 36a-36d which extend longitudinally there through. In one embodiment, the first arm 34a contains two bores 36a, 36d and the second arm 34b also contains two bores 36b, 36c. The bores 36a-36d are configured to receive bolts 41 or other similar attaching means well known to those of ordinary skill in the art. The bolts 41 or other attaching means may be used to secure the pin 24 in the insertion ramp 34 via the removable clamp 40. For example, as shown in FIG. 4, in an exemplary embodiment, the removable clamp 40 also comprises bores 43a-43d which extend longitudinally through the removable clamp 40. In some embodiments the first clamp bar 40a and the second clamp bar 40b each contain bores 43a-43d which extend longitudinally there through. In one embodiment, the first clamp bar 40a contains two bores 43a, 43d and the second clamp bar 40b also contains two bores 43b, 43c. The bores 43a-43d are configured to receive bolts 41 or other attaching means. The bolts 41 or other attaching means may be used to secure the pin 24 in the insertion ramp 34 via the removable clamp 40. Bolts 42 or similar devices well known to those of ordinary skill in the art may be used to secure the pins 41 once they are disposed through the insertion ramp 34 and the removable clamp 40.

The connection device 10 described above is advantageous in that it eliminates the time consuming process of aligning (and maintaining the alignment) of the holes in heavy mobile conveyors/mobile conveyor sections and eliminates the need for press fitting a pin through the aligned holes in order to attach mobile conveyors. Instead, the connection device 10 disclosed herein allows for quick assembly and de-assembly without the use of complex equipment, without endangering employees and without welding the mobile conveyors/mobile conveyor sections together.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

LIST OF COMPONENTS

1—first mobile conveyor/first mobile conveyor section
1a—first mobile conveyor frame
2—second mobile conveyor/second mobile conveyor section
2a—second mobile conveyor frame
10—connection device
20—first portion of connection device
21—upper first portion clamp
22—lower first portion clamp
23—first middle nub portion
24—pin
25—spherical bearing
30—second portion of connection device
31—upper second portion clamp
32—lower second portion clamp
33—second middle nub portion
34—insertion ramp
34a—first arm of insertion ramp
34b—second arm of insertion ramp
35—first semicircular cavity
36a, 36b, 36c, 36d—bores
40—removable clamp
40a—first clamp bar
40b—second clamp bar
41—bolts
42—nuts
43a, 43b, 43c, 43d—bores
45—second semicircular cavity
a—angle
H—horizontal plane

The invention claimed is:

1. A mobile conveyor system for stacking aggregate comprising:
   a first mobile conveyor section (1) comprising a first mobile conveyor frame (1a);
   a second mobile conveyor section (2) comprising a second mobile conveyor frame (2a); and
   a connection device (10) for attaching and detaching the first mobile conveyor frame (1a) to and from the second mobile conveyor frame (2a), the connection device (10) being laterally disposed between the first mobile conveyor section (1) and the second mobile conveyor section (2) and attached to the first mobile conveyor frame (1a) and second mobile conveyor frame (2a);
   wherein the connection device (10) comprises:
   a first portion (20) for connection to the first mobile conveyor frame (1a), the first portion (20) comprising an upper first portion clamp (21), a lower first portion clamp (22) and a first middle nub portion (23) disposed between the upper and lower first portion clamps (21, 22), the first middle nub portion (23) comprising a spherical bearing (25) with a pin (24) disposed laterally there through;
   a second portion (30) for connection to the second mobile conveyor frame (2a), the second portion (30) comprising an upper second portion clamp (31), a lower second portion clamp (32) and a second middle nub portion (33) disposed between the upper and lower second portion clamps (31, 32), the second middle nub portion (33) comprising an insertion ramp (34); and
   a removable clamp (40) for securing the pin (24) in the insertion ramp (34).

2. The mobile conveyor system of claim 1, wherein the insertion ramp (34) comprises a first arm (34a) and a second arm (34b) and wherein the first arm (34a) and the second arm (34b) define a first semicircular cavity (35), the first semicircular cavity (35) being configured to receive a laterally extending portion of the pin (24).

3. The mobile conveyor system of claim 1, wherein the first arm (34a) and the second arm (34b) are at an angle (a) of approximately 0 to 60 degrees with a horizontal plane (H).

4. The mobile conveyor system of claim 3, wherein the angle (a) is approximately 30 degrees.

5. The mobile conveyor system of claim 1, wherein the removable clamp (40) comprises a first clamp bar (40a) and a second clamp bar (40b) and wherein the first clamp bar (40a) and the second clamp bar (40b) define a second semicircular cavity (45), the second semicircular cavity (45) being configured to receive a laterally extending portion of the pin (24).

6. The mobile conveyor system of claim 2, wherein the first arm (34a) and the second arm (34b) comprise bores (36a-36d), the bores (36a-36d) being configured to receive bolts (41) for securing the pin (24) in the insertion ramp (34) via the removable clamp (40).

7. The mobile conveyor system of claim 5, wherein the first clamp bar (40a) and the second clamp bar (40b) comprise bores (43a-43d), the bores (43a-43d) being configured to receive bolts (41) for securing the pin (24) in the insertion ramp (34) via the removable clamp (40).

8. A connection device (10) for attaching and detaching a frame (1a) of a first mobile conveyor section (1) to or from a frame (2a) of a second mobile conveyor section (2), the connection device (10) comprising:
- a first portion (20) for connection to the first mobile conveyor frame (1a), the first portion (20) comprising an upper first portion clamp (21), a lower first portion clamp (22) and a first middle nub portion (23) disposed between the upper and lower first portion clamps (21, 22), the first middle nub portion (23) comprising a spherical bearing (25) with a pin (24) disposed laterally therethough;
- a second portion (30) for connection to the second mobile conveyor frame (2a), the second portion (30) comprising an upper second portion clamp (31), a lower second portion clamp (32) and a second middle nub portion (33) disposed between the upper and lower second portion clamps (31, 32), the second middle nub portion (33) comprising an insertion ramp (34); and
- a removable clamp (40) for securing the pin (24) in the insertion ramp (34).

9. The connection device (10) of claim 8, wherein the insertion ramp (34) comprises a first arm (34a) and a second arm (34b) and wherein the first arm (34a) and the second arm (34b) define a first semicircular cavity (35), the first semicircular cavity (35) being configured to receive a laterally extending portion of the pin (24).

10. The connection device (10) of claim 8, wherein the first arm (34a) and the second arm (34b) are at an angle (a) of approximately 0 to 60 degrees with a horizontal plane (H).

11. The connection device (10) of claim 10, wherein the angle (a) is approximately 30 degrees.

12. The connection device (10) of claim 8, wherein the removable clamp (40) comprises a first clamp bar (40a) and a second clamp bar (40b) and wherein the first clamp bar (40a) and the second clamp bar (40b) define a second semicircular cavity (45), the second semicircular cavity (45) being configured to receive a laterally extending portion of the pin (24).

13. The connection device (10) of claim 9, wherein the first arm (34a) and the second arm (34b) comprise bores (36a-36d), the bores (36a-36d) being configured to receive bolts (41) for securing the pin (24) in the insertion ramp (34) via the removable clamp (40).

14. The connection device (10) of claim 12, wherein the first clamp bar (40a) and the second clamp bar (40b) comprise bores (43a-43d), the bores (43a-43d) being configured to receive bolts (41) for securing the pin (24) in the insertion ramp (34) via the removable clamp (40).

* * * * *